United States Patent [19]

Schlatter

[11] Patent Number: 5,142,118
[45] Date of Patent: Aug. 25, 1992

[54] LASER WELDING UNIT

[75] Inventor: Howard M. Schlatter, Rochester Hills, Mich.

[73] Assignee: Progressive Tool & Industries Co., Southfield, Mich.

[21] Appl. No.: 699,896

[22] Filed: May 14, 1991

[51] Int. Cl.$^5$ .............................................. B23K 26/00
[52] U.S. Cl. ............................. 219/121.63; 219/121.82
[58] Field of Search ...................... 219/121.63, 121.64, 219/121.82, 121.83

[56] References Cited

U.S. PATENT DOCUMENTS

| | | | |
|---|---|---|---|
| 4,223,201 | 9/1980 | Peters et al. ................... | 219/121.63 |
| 4,578,554 | 3/1986 | Coulter ........................... | 219/121.63 |
| 4,607,150 | 8/1986 | Bannister ....................... | 219/121.63 |
| 4,626,999 | 12/1986 | Bannister ..................... | 219/121.67 X |
| 4,634,832 | 1/1987 | Martyr ........................... | 219/121.63 |
| 4,654,505 | 3/1987 | Sciaky et al. ................. | 219/121.63 |
| 4,661,681 | 4/1987 | Bannister ....................... | 219/121.78 |
| 4,676,586 | 6/1987 | Jones et al. ..................... | 350/96.20 |
| 4,698,479 | 10/1987 | Rando et al. .................. | 219/121.79 |
| 4,764,655 | 8/1988 | Oritz, Jr. et al. ............... | 219/121.83 |
| 4,831,233 | 5/1989 | Gordon .......................... | 219/124.34 |
| 4,843,209 | 6/1989 | Milligan ......................... | 219/121.63 |
| 4,845,335 | 7/1989 | Andrews et al. ............... | 219/121.63 |
| 4,847,467 | 7/1989 | Ausilio ........................... | 219/121.63 |
| 4,906,812 | 3/1990 | Nied et al. ...................... | 219/121.63 |
| 4,973,817 | 11/1990 | Kanno et al. .................. | 219/121.63 |
| 4,983,796 | 1/1991 | Griffaton ........................ | 219/121.63 |
| 4,991,707 | 2/1991 | Alexander et al. ............. | 198/346.1 |

Primary Examiner—C. L. Albritton
Attorney, Agent, or Firm—Basile and Hanlon

[57] ABSTRACT

A laser welding head carried by a robotic arm welds sheet metal workpieces to each other along an elongate seam while maintaining a precise focusing of the laser beam on the seam as it is formed in the face of minor variations in the dimensions, shape and positioning of successive workpieces. The head includes a workpiece gripping assembly including a fluid pressure actuated motor having its cylinder coupled to one of two workpiece engaging members and its piston rod coupled to the other to shift the members between an open workpiece release position and a closed workpiece clamping position in which the assembly clamps the two workpiece fixedly against each other with a clamping force determined by the pressure applied to the motor. The gripping assembly is movable mounted upon a base member fixed to the robotic arm. When the workpieces are clamped by the assembly, at least one of the workpieces is engaged by a roller carried on one of the workpiece engaging members, and a laser beam focusing unit carried by that workpiece engaging member focuses the beam precisely on the surface of the roller engaged workpiece. The robotic arm moves the workpiece engaging member along the seam by rolling the roller along the workpiece surface. The workpiece gripping assembly is movable as a unit relative to the base member to "float" along the seam as may be required by deviations of the roller engaged workpiece surface from its intended position.

13 Claims, 6 Drawing Sheets

LASER WELDING UNIT

BACKGROUND OF THE INVENTION

The present invention is directed to a laser welding unit adapted to be mounted upon a robotic arm programmed to drive the unit along a seaming path to join, by an accurately focused laser beam, two sheet metal panel members to each other along a longitudinally extended seam.

Although useful in many other applications, the welding units of the present invention are particularly well adapted to use production line welding of sheet metal body panels of an automotive vehicle either in the welding of components to an individual panel or the assembly of major body panels on a body framing line. In a typical body framing operation, the main or basic sheet metal body panels are loosely assembled to each other upon a sled which conveys the panels to successive work stations. The basic panels include a floor panel, right and left body side panels, a fire wall, and header or cross frame members which extend transversely of the body between the side panels. The floor panel is fixedly mounted to the sled, and the other panels are loosely assembled on the floor panel as by a so-called toy tab arrangement.

This assembly is not a rigid assembly and, at the first welding station, a clamp system is employed to fixedly clamp the various panels in an accurately aligned relationship and to hold the panels in this position while the welding operation joining the panels to each other is performed. The conventional welding units employed are resistance welding units in which an electrode is forcibly pressed against one sheet metal panel at one side of the seam and energized to produce a spot weld.

This particular system has several drawbacks. Among these are the fact that the welding heads are quite bulky and clearance problems frequently arise in moving the welding head to and from its welding position past or around various portions of the vehicle body and the clamps and clamping frames employed to hold the body panels in position during the welding operation. The electrical power requirements of the welding operation are such that a relatively heavy power cable must be led to the head of the welding unit, and mechanism for applying fairly substantial pressures to press the welding electrode against the panels being welded are required.

Utilization of laser welding in applications such as automotive body framing has been actively investigated, however, power limitations and the problems involved in the design of a mirror system for guiding a laser beam from its generator to the operating end of a multi axis robotic arm have severely restricted the number of practical applications in which laser welding could be economically employed.

Recent developments in the laser field have resulted in units capable of increased power outputs and YAG lasers having power outputs fully sufficient to perform automotive body welding operations are now commercially available. These YAG units have the substantial advantage of enabling a laser beam of the required power to be conducted to a beam focusing unit of a welding head at the end of a robotic arm via a flexible fiberoptic cable, thus eliminating the requirement of a complex mirror system for transmitting the beam from the laser to the welding head.

In mass production laser welding operations, the precision with which the beam must be focused frequently greatly exceeds the degree of precision possible in positioning the sheet metal parts to be welded. In the automotive body welding panel application referred to above, manufacturing tolerances on the sled which carries the body panels, manufacturing tolerances of the clamps and clamping frame employed to clamp the panels in position for welding, dimensional variations of the individual panels from the ideal standard or unintended bending or warping of the panel, and the precision of alignment between the sled, clamping frame and welding unit all can introduce errors in positioning the panels relative to the laser beam focusing head which are many times greater than the maximum permissible variation of position relative to the point at which the laser beam is focused. Stated another way, commercially available robotic arms can be programmed to move a welding head along a path which is precisely located relative to a fixed reference frame. This path may follow a line which is matched to a seam line between two sheet metal members of a specific designed shape. The problem posed by welding such seams on a mass production basis is primarily that of accurately aligning the seaming line of the sheet metal parts with the path followed by the welding head on the robotic arm.

A second problem presented in laser welding two sheet metal parts to each other is the requirement that the two sheet metal parts be in abutment with each other or at worst within a minimum spacing from each other along the seaming line. For laser welding, the maximum spacing between the parts which will enable an adequate weld to be made is considered to be about 10% of the thickness of the thinner of the two sheet metal members. A three mil sheet metal thickness is quite common in automotive vehicle body applications. Stamped sheet metal panels cannot generally be formed with a degree of precision which would assure such spacing. In a resistance welding application, the two opposed panels are forcibly clamped against each other under relatively high pressure by the opposed electrodes, hence the spacing problem is of no concern in resistance welding applications. The laser beam, however, does not exert any physical force upon the parts which it is welding.

The present invention is directed to a laser welding unit addressed to the foregoing problems.

SUMMARY OF THE INVENTION

Two forms of apparatus embodying the invention are disclosed. Both forms of welding units include two roller carrying members movable relative to each other by a fluid pressure actuated motor having its cylinder connected to one of the two members and its piston rod connected to the other. With the piston rod extended, both forms of the invention find the rollers on the two members clampingly gripping two sheet metal members into face to face engagement with each other between the rollers.

One of the roller carrying members has a laser beam focusing unit mounted directly upon the member at a location adjacent the roller carried by that member. The two rollers tightly clamp the two sheet metal members in abutment with each other with a force determined by the pressure applied to the fluid pressure actuated motor, thus solving the sheet metal member spacing problem referred to above, while the fixed relationship between the beam focusing unit and the roller mounted on the member carrying the focusing unit assures that the beam will be precisely focused relative to that sheet metal member engaged by the last mentioned roller.

The two roller carrying members and the fluid pressure motor coupled between the two members are mounted as a unit upon a base member which is in turn fixedly mounted at the end of a robotic arm. In one form, the two roller carrying members are arranged in a scissor type relationship upon their base member that is the two members are mounted for pivotal movement about a common pivot axis fixed with respect to the base member and located about midway of the length of the two roller carrying members. A spring engaged between the base member and one of the two roller carrying members normally resiliently biases its engaged roller carrying member about the pivot axis in a direction which would urge the roller on the spring engaged member toward engagement with a sheet metal part being welded. In that the two roller carrying members are mechanically coupled to each other by the fluid pressure motor cylinder and piston, effectively the whole unit represented by the two roller carrying members and their fluid pressure motor is a work gripping assembly biased in one direction of rotation relative to the base member about the pivot axis. An adjustable stop engageable between one of the roller carrying members and the base member defines an end limit to pivotal motion of the assembly in one direction at a location such that when the piston rod of the actuating motor is fully retracted, the two rollers at the respective other ends of the two roller carrying members are spaced from each other and would be spaced from two sheet metal members supported by a fixture in a welding position. Upon extension of the piston rod of the motor to shift the two rollers into clamping engagement with the sheet metal members, one roller will be shifted into contact with the sheet metal member while the stop remains engaged, further extending movement of the piston rod will move the other roller toward engagement and at some point prior to clamping engagement, the assembly will shift against the action of the biasing spring to disengage the stop as the two sheet metal members are clamped between the rollers.

When so clamped, the roller carrying members can float about their pivot axis on the base member to compensate for variations in the position of the sheet metal members relative to the ideal designed position relative to the robotic arm.

With this arrangement, the clamping force exerted by the fluid pressure actuated motor clamping the opposed surfaces of the sheet metal members against each other is a constant force determined by the magnitude of the pressure applied to the motor. The fluid pressure actuated motor and the two roller carrying members constitute a workpiece gripping assembly which is movable as a unit relative to the base member upon which it is mounted, the spring being engaged between the base unit and one element of the workpiece gripping assembly. In the case of the scissor type embodiment, both roller carrying members are mounted, intermediate their ends, upon a common pivot pin mounted on the base unit.

In a second form, one roller carrying member is mounted for reciprocatory movement on the base member limited by a spring and stop arrangement similar to that previously described. The cylinder of the fluid motor is mounted upon this roller carrying member with the cylinder axis parallel to the reciprocatory path and the other roller carrying member is mounted on the piston rod of the motor.

Other objects and features of the invention will become apparent by reference to the following specification and to the drawings.

IN THE DRAWINGS

DETAILED DESCRIPTION OF THE PREFERRED EMBODIMENTS

Figure 1:
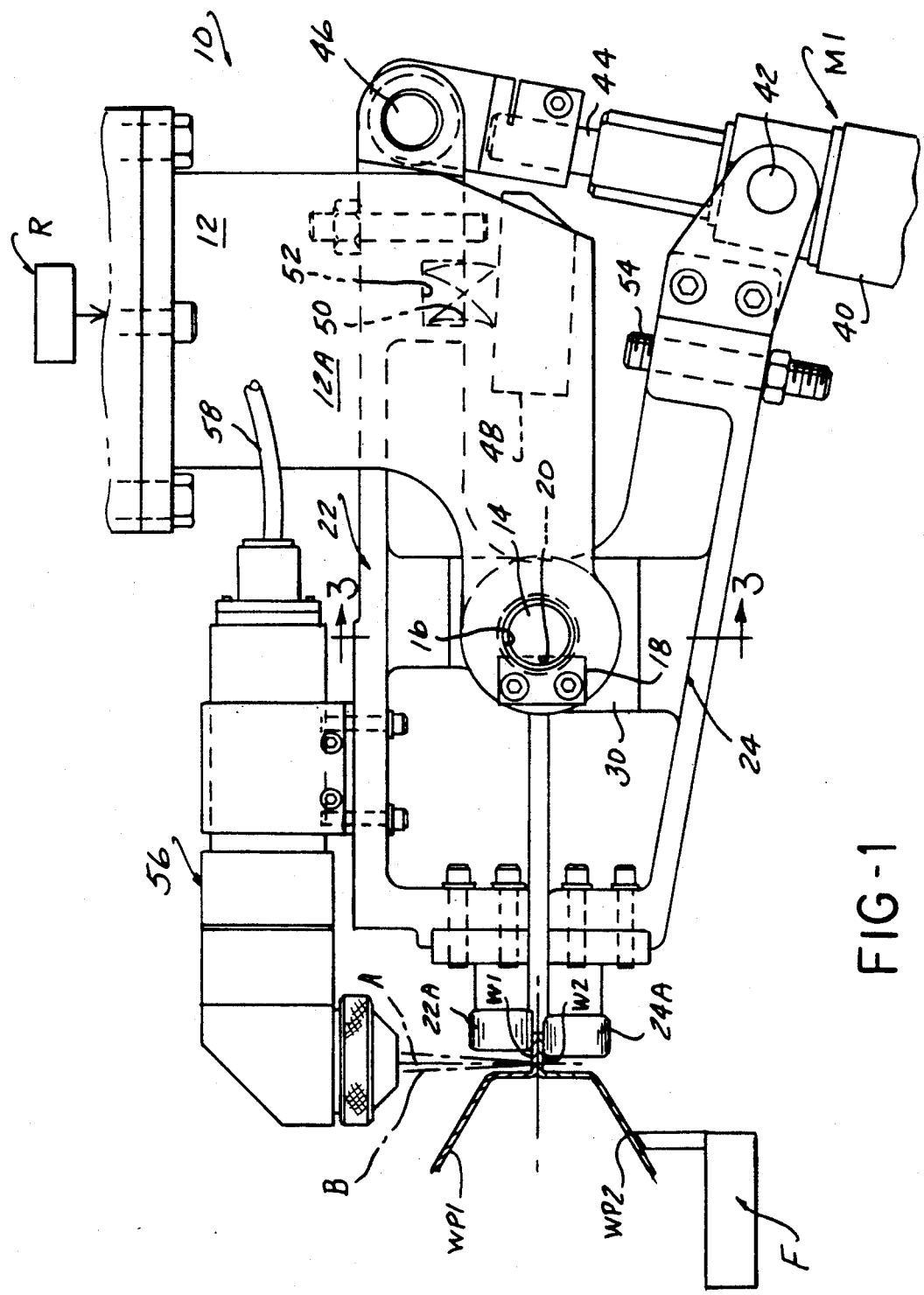
FIG. 1 is a side elevational view of one welding head assembly embodying the present invention, showing the assembly in a workpiece gripping position, certain parts being broken away, shown in section, or schematically indicated.
Figure 2:
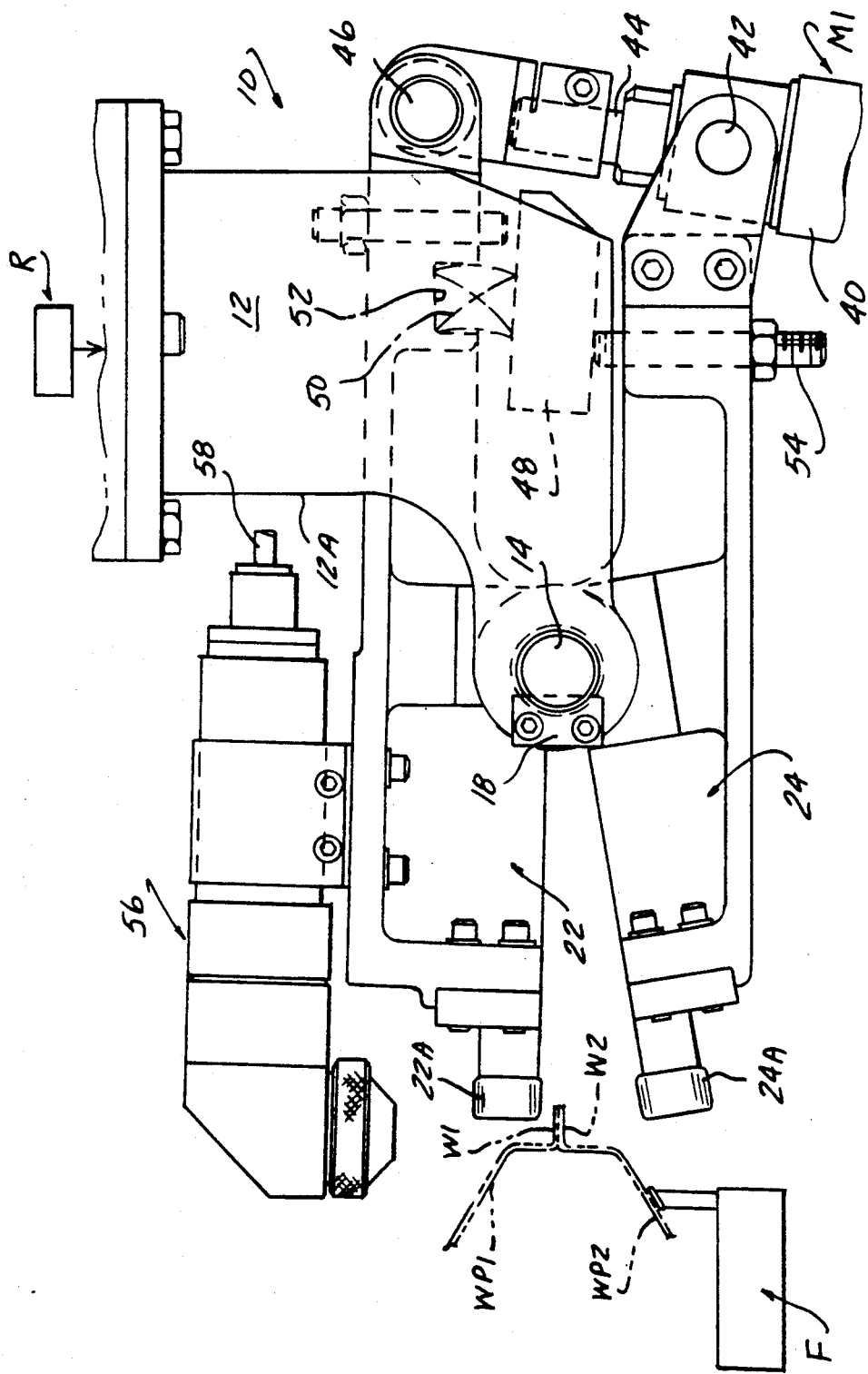
FIG. 2 is a side elevational view of the assembly of FIG. 1, showing the assembly in an open, workpiece release position.
Figure 3:
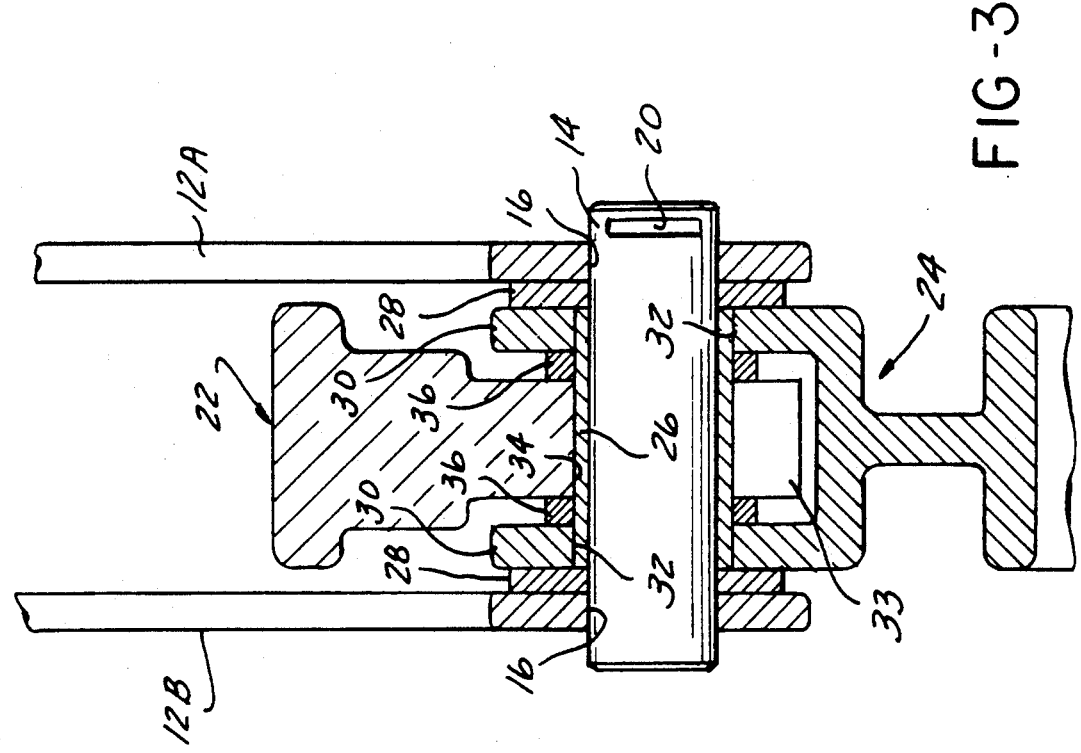
FIG. 3 is a detail cross sectional view taken on line 3—3 of FIG. 1.

Referring first to FIGS. 1-3, a first embodiment of the invention takes the form of what will be referred to as a scissor type laser welding head designated generally 10 which is mounted at the end of a robotic arm schematically indicated at R which may be programmed to move the head 10 along various selected paths suitably conformed to the configuration of workpieces to be welded to each other by the head. Programmable computer controlled robotic arms possessing such capabilities are commercially available from several sources, and the robotic arm R per se forms no part of the present invention. Where the workpiece configuration is such that only a simple straight line seam needs to be welded, a simple carrier mounted upon a track may be employed in place of the more sophisticated robotic device.

The welding heads of the present invention are intended to be used in a production line environment in which workpieces to be welded are positioned by a fixture at a predetermined position at the welding station, such a fixture being schematically indicated at F in FIGS. 1 and 2. One example of such a system is disclosed in U.S. Pat. No. 4,991,706 in which a sheet metal automotive body side panel is advanced along a conveying line to various work stations at which mounting brackets, door lock and hinge reinforcing elements, or similar parts may be welded to the main panel.

In the application shown in FIGS. 1-3, two sheet metal workpieces WP1 and WP2 are formed with outwardly projecting strip-like webs W1, W2 respectively which are supported in face to face engagement with each other by the fixture F. For present purposes, it will be assumed that the webs W1 and W2 are longitudinally elongated in the direction perpendicular to the paper as viewed in FIGS. 1 and 2.

Welding head 10 includes a rigid base member designated generally 12 which is fixedly secured to the end of the robotic arm R. Base member 12 includes a pair of spaced side plates 12A, 12B (FIG. 3) and a main pivot pin 14 extends through and is supported in aligned bores 16 in the arms 12A, 12B. Pin 14 is detachably held against displacement by a keeper plate 18 bolted to arm 12A and projecting into a slot 20 (FIG. 3) in pin 14.

A pair of workpiece engaging or gripping arms designated generally 22 and 24 are supported by pivot pin 14 upon base member 12 for pivotal movement relative to base member 12 about the axis of pivot pin 14. As best seen in FIG. 3, a bushing 26 is mounted upon pin 14 to extend between spacers 28 located at the inner side of each of the side plates 12A and 12B of base member 12. Work engaging member 24 is formed with a yoke section having a pair of spaced webs 30 formed with bores 32 which rotatively receive bushing 26. The other work engaging member 22 is formed with a single web 33 which projects downwardly between the yoke webs 30 of member 24. Web 33 is formed with a bore 34 which receives the bushing 26, a second set of spacers 36 axially spacing the central web 33 of member 22 from the side webs 30 of member 24.

Work engaging rollers 22A, 24A are mounted upon the respective work engaging members 22, 24 at the left-hand end of each member as viewed in FIGS. 1 and 2. Rollers 22A, 24A are rotatable upon their respective members 22 and 24 about axes which lie in the plane of the paper in FIGS. 1 and 2 and extend substantially parallel to each other when the members 22 and 24 are in the workpiece engaging or gripping position shown in FIG. 1.

A fluid pressure actuated motor designated generally M1, typically a pneumatic motor is coupled between the opposite ends of the respective workpiece engaging members 22 and 24, and includes a cylinder partially illustrated at 40 connected by a pivot 42 to the right-hand end of member 24 as viewed in FIGS. 1 and 2, while the piston rod 44 of the motor is connected to the right-hand end of member 22 as by pivot pin 46.

It should be noted that the two workpiece engaging members 22, 24 and the actuating motor M1 are interconnected to each other in a work gripping assembly mounted, by pivot pin 14, upon the base member 12 of the head for movement as a unit relative to member 12 about the axis of pivot 14. This unitary movement of the assembly which includes members 22, 24 and motor M1 can occur regardless of whether the motor has its piston rod fully retracted as in FIG. 2 or extended as in FIG. 1.

To establish a normal rest position of the work gripping assembly of members 22, 24, and M1 about the axis of pivot pin 14, a stop block 48 is fixedly mounted upon base member 12 to extend between the side plates 12A, 12B of the base member. A compression spring 50 seated at its upper end in a spring seat defining bore 52 and member 22 is engaged and compressed between member 22 and the upper surface of stop block 48 as best seen in FIG. 2. As viewed in FIG. 2, spring 50 biases the workpiece gripping assembly of members 22, 24, and M1 as a unit in counterclockwise rotation about the axis of pivot pin 14, rotation of the assembly in the counterclockwise direction being limited by the engagement of an adjustable stop screw 54 threadably received in member 24 with stop block 48 as shown in FIG. 2.

A laser beam focusing unit designated generally 56 is fixedly mounted upon workpiece engaging member 22 at a location such that a laser beam indicated in broken line at B in FIG. 1 can be accurately focused at a selected location along a beam axis A which passes forwardly clear (to the left as viewed in FIG. 1) of the workpiece engaging rollers 22A and 24A. Because the focusing unit 56 is fixedly mounted upon member 22 in a fixed relationship to the axis of roller 22A, the beam B can be precisely focused at or adjacent to the lowermost surface of web W1 of workpiece WP1 when roller 22A is engaged with web W1.

The system preferably employs a YAG laser (not shown) from which the laser beam is transmitted to the beam focusing unit 56 by a fiberoptic cable 58, laser systems of this type being known in the art, see, for example, U.S. Pat. Nos. 4,906,812 and 4,973,817, for example. The utilization of a fiberoptic cable as the beam transmission system is of substantial convenience as compared to a mirror transmission system, particularly where the beam must be conducted to a device at the end of a multi-axis robotic arm.

Operation of the embodiment of the invention shown in FIGS. 1-3 is as follows.

Referring to FIG. 2, workpieces to be welded to each other, namely WP1 and WP2, are positioned by a support or fixture F at a predetermined location at a welding station. In the application shown in FIGS. 1-3, the two workpieces are formed with elongate strip-like web portions W1, W2 and are supported by the fixture F in a position such that the two webs W1, W2 are in opposed face to face abutment with each other. In FIGS. 1 and 2, the webs W1 and W2 are shown in transverse cross section, the longitudinal extent of the webs is in a direction perpendicular to the plane of the paper.

With the workpieces positioned in the welding position shown in FIG. 2, the robotic arm R is actuated to bring the welding head 10 into the ready position relative to the workpieces shown in FIG. 2. At this time, actuating motor M1 is in its inactive position with its piston rod 44 fully retracted into cylinder 40, thus positioning members 22 and 24 in the open position shown in FIG. 2 wherein the workpiece engaging rollers 22A and 24A are spaced apart as shown and located at opposite sides of the abutted webs W1, W2.

The embodiment of FIGS. 1-3 is intended to stitch weld the abutted webs to each other by focusing a laser beam from focusing unit 56 on a seaming line lying in the general plane of abutment of the opposed surfaces of the webs W1 and W2. In the case where the sheet metal workpieces WP1 and WP2 are automotive body panel components, typically the thickness of the sheet metal is three mils. To obtain a satisfactory weld between the two opposed webs, it is necessary that the two webs be in actual face to face contact with each other, or at the worst, spaced apart by a distance less than 10% of the thickness of the thinner of the two sheet metal workpieces. To effectively form the weld, the laser beam must be focused within a similar dimensional tolerance. In mass production applications, certain practical problems arise in the focusing of a laser beam upon an elongate seam as the beam is moved longitudinally along the seam.

With the fixed frame of the robotic arm considered as a fixed reference point, presently available programmable robotic arms are capable of moving the tool carrying end of the arm along a predetermined path with a fairly high degree of precision. However, positioning the workpieces to be welded so that a seaming line between two abutted webs, such as the webs W1 and W2 is matched to the path of movement of the welding head by the robotic arm with a degree of precision sufficient to enable the repetitive production of satisfactory seam welds cannot, for several reasons, be economically accomplished in mass production applications.

The first tolerance problem encountered arises in the forming of the sheet metal workpiece and its subsequent handling prior to the welding. Particularly where the sheet metal workpiece is of reasonably substantial dimensions, such as an automotive body side panel, the panel may become slightly bent or warped incident to the handling of the panel during its journey from the stamping machine to the welding station.

A second source of positioning errors arises from the fixture F, which typically will be advanced to the welding position by some form of conveyor or article transfer device. Where an entire vehicle body is advanced to the welding station on a sled, positioning the sled, which typically will be one of a series of sleds whose dimensions may vary slightly from sled to sled, to a degree of precision of say 1/1000th of an inch with respect to a fixed reference point represented by the fixed frame of the robotic arm is not practically possible. Further, the sheet metal panels are positioned relative to the sled or fixture by a series of clamps, in some cases mounted upon the sled and in some cases mounted upon workpiece locating frames at the welding station, and these clamps introduce further dimensional variations.

In accordance with the present invention, abutment of the opposed surfaces to be welded, at least at the point at which welding is taking place, is assured by gripping the opposed sheet metal elements between the rollers 22A and 24A with a fairly substantial force developed by the pressure applied to the actuating motor. The laser beam is focused on the general plane of abutment of the opposed surfaces closely adjacent the rollers, and as the rollers roll longitudinally along the seam, the beam moves with and is focused at a point fixedly located relative to the rollers. Positional variances of the surfaces being welded relative to a fixed reference point is automatically compensated for by permitting the workpiece gripping assembly constituted by members 22, 24, and motor M1 to float or shift relative to the base unit as may be required by deviations of the webs being welded from their theoretically designed position.

For example, referring to FIG. 2, the webs W1 and W2 as there illustrated are shown with their opposed surfaces engaging each other in a horizontal general plane normal to the plane of the paper. In theory, the two webs W1, W2 will abut throughout their length precisely at this imaginary horizontal general plane; in practice, the two webs may abut as illustrated in FIG. 2 at one point along the seam while at a point spaced longitudinally of the seam from that point, one or both of the webs may be above or below the position shown in FIG. 2. The manner in which the workpiece gripping portion of the assembly floats is best understood by following the movement of these parts as they are moved from the open position of FIG. 2 to the closed workpiece gripping position of FIG. 1 by extension of the piston rod 44 from cylinder 40 of the fluid pressure actuated motor.

Commencing with the parts in the position shown in FIG. 2, and assuming that fluid pressure is applied to cylinder 40 to drive piston rod 44 in extending movement—i.e. upwardly as viewed in FIG. 2—it should be noted that at the start of this movement of the piston rod, compression spring 50 is compressed between stop block 48 on base member 12 and the upper workpiece engaging member 22 while the lower workpiece engaging member 24 has the abutment screw 54 carried by this member engaged with the underside of stop block 44 by virtue of the fact that the spacing between pivots 42 on motor cylinder 40 and pivot 46 on piston rod 44 are held against separating movement by the cylinder-piston rod interconnection. As piston rod 44 begins to extend, the pivots 42 and 46 on the respective members 24 and 22 begin to separate as viewed in FIG. 2. Spring 50 is still exerting a force upwardly against member 22, and while this spring force decreases as piston rod 44 extends, it is still a sufficient force to maintain abutment screw 44 in contact with stop block 48. Thus, the initial closing movement finds member 22 moving in a counterclockwise direction about pivot 14 while work engaging member remains stationary in the position shown in FIG. 2.

This pivotal movement of member 22 continues until its roller 22A engages the upper surface of web W1 of the supported workpiece. With roller 22A engaged with web W1, movement of member 22 about pivot 14 stops, and further extension of piston rod 44 finds the piston rod remaining stationary and cylinder 40 moving downwardly to swing member 24 in clockwise movement about pivot 14, moving adjustment screw 54 downwardly away from stop block 48 and swinging roller 24A upwardly toward the underside of workpiece web W2. When the piston rod 44 is fully extended relative to cylinder 40, the various parts are in the position shown in FIG. 1 with the webs W1 and W2 gripped between rollers 22A and 24A with a force dependent upon the pressure applied within cylinder 40 urging piston rod 44 to its fully extended position.

At this time, the position of the work gripping assembly constituted by members 22, 24 and fluid pressure motor M1 relative to the base member 12 is determined by the position of the workpieces WP1 and WP2 whose webs W1 and W2 are now tightly gripped between the rollers 22A, 24A. Spring 50 is still partially compressed, and exerts a force biasing member 22 in counterclockwise movement about pivot pin 14. However, the engagement of roller 22A on member 22 with web W1 of the stationary workpieces prohibits any counterclockwise movement of member 22 and of member 24, which is coupled to member 22 by the fluid pressure motor 40, 44 which effectively acts as a rigid link at this time. Movement of the work gripping assembly in the opposite direction about pivot pin 14, i.e. in a clockwise direction about pivot pin 14 is prohibited by the engagement of roller 24A of member 24 with the underside of web W2.

As indicated in FIG. 1, the laser beam B emitted from focusing unit 56 is focused on the point at which the opposed surfaces of webs W1 and W2 abut each other. To form a seam extending longitudinally of the webs, the robotic arm is then actuated to move the entire assembly in a direction directly away from the observer in FIG. 1, the rollers 22A and 24A rolling freely along the respective webs to accommodate this movement while maintaining a tight clamping grip holding the webs in abutment with each other adjacent the point at which the laser beam is focused.

If, during this movement, the abutted webs might curve slightly upwardly to a position above that illustrated in FIG. 1, the assembly of members 22, 24, cylinder 40 and piston rod 44 will pivot as a unit in a clockwise direction about the axis of pin 14 to follow this elevation of the two webs, this movement being resisted by spring 50, which must be slightly compressed to accommodate this clockwise movement of the gripping assembly. If, on the other hand, the engaged webs might bend slightly downwardly, the work gripping assembly of members 22, 24, 40 and 44 can pivot as a unit in a counterclockwise direction about the axis of pin 14, spring 50 expanding slightly in the process.

A second form of head embodying the present invention is disclosed in FIGS. 4-7. The basic principal of operation of this second embodiment is the same as that of the embodiment of FIGS. 1-3, however, a different structural arrangement is utilized.

As in the embodiment of FIGS. 1-3, two sheet metal workpieces WP3, WP4 respectively having elongate strip-like web portions W3, W4, are supported in a fixed, predetermined position by a suitable fixture F1. A laser welding head designated generally 100 is mounted at the end of a robotic arm R1 to weld the abutted workpiece webs W3 and W4 to each other along a longitudinally extending seam extending toward or away from the observer as viewed in FIGS. 4 and 5.

Figure 4:
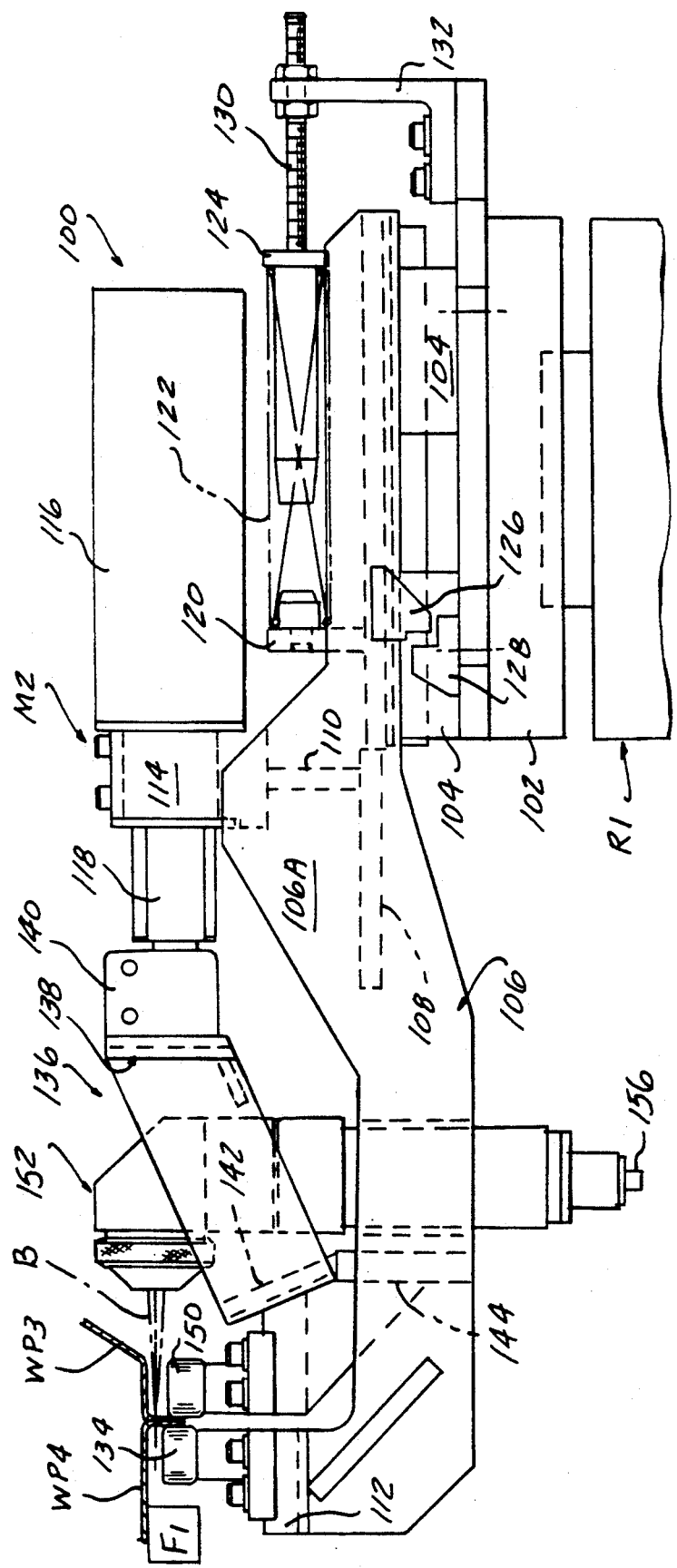
FIG. 4 is a side elevational view of a second form of welding unit, with certain parts broken away, shown in section or schematically.
Figure 5:
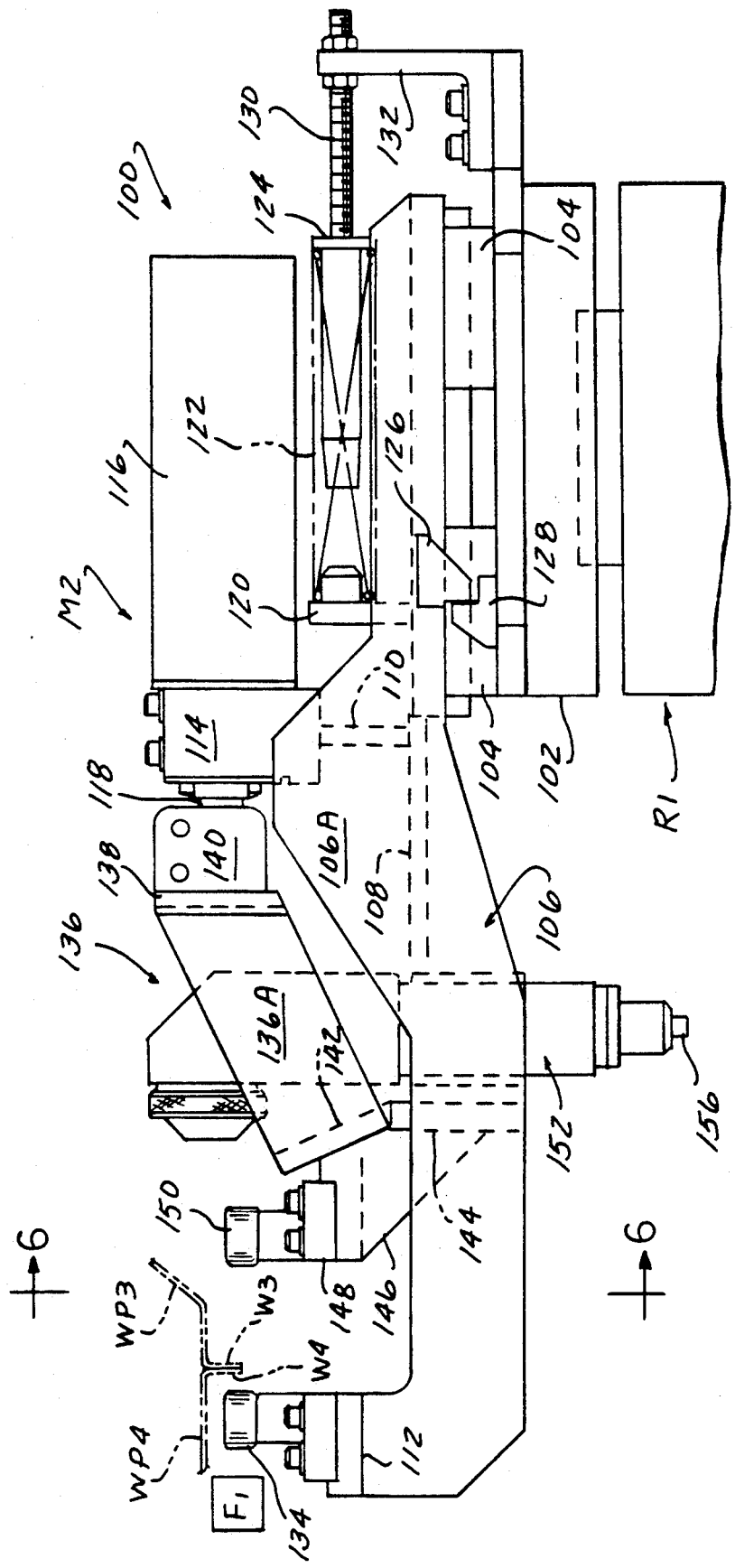
FIG. 5 is a side elevational view of the assembly of FIG. 4, showing the unit in a workpiece release position.
Figure 7:
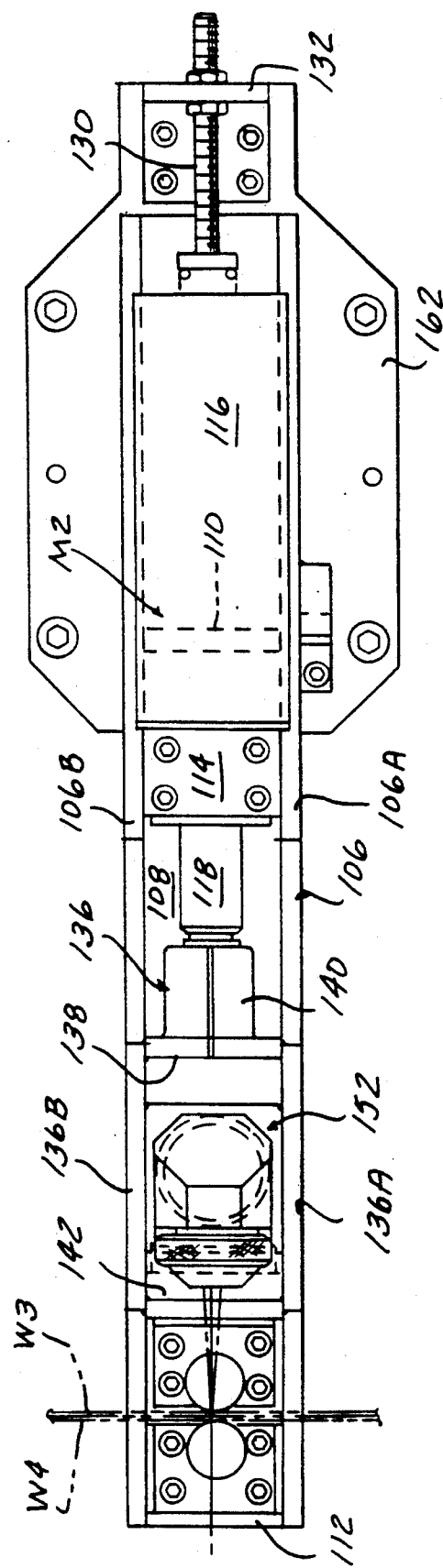
FIG. 7 is a top plan view of the assembly of FIG. 4.

The head 100 includes a base member 102 fixedly mounted at the end of the robotic arm R1 which carries a plurality of ball slide assemblies 104 which support and guide a first workpiece engaging member 106 for horizontal movement relative to base 102 from right to left and vice versa as viewed in FIGS. 4 and 5. As best seen in the top plan view of FIG. 7, the member 106 is formed with a pair of spaced side plates 106A, 106B fixedly held in spaced parallel relationship by transversely extending webs such as 108, 110, 112. The web 110 supports at its upper end a bracket 114 which fixedly mounts the cylinder 116 of a fluid pressure actuated motor M2 upon the first work engaging member 106, with the axis of the cylinder 116 and its piston rod 118 extending parallel to the horizontal path of movement of member 106 relative to base member 102.

A spring seat 120 (FIGS. 4 and 5) is fixedly mounted upon member 106 and a compression spring 122 is engaged between spring seat 120 on member 106 and an opposed axially adjustable spring seat 124 carried by base member 102. Spring 122 continuously biases member 106 to the left as viewed in FIGS. 4 and 5, and movement of member 106 to the left relative to base member 102 is limited by the engagement between a stop 126 fixedly mounted on member 106 and an opposed stop 128 fixedly mounted on member 102. The compressive force exerted by the biasing spring 122 can be adjusted by the threaded interconnection 130 between spring seat 124 and a mounting bracket 132 fixedly mounted on base member 102.

Member 106 carries a Workpiece engaging roller 134 at its forward or left-hand end as viewed in FIGS. 4 and 5, roller 134 in this instance being mounted for rotation about a vertical axis.

Figure 6:
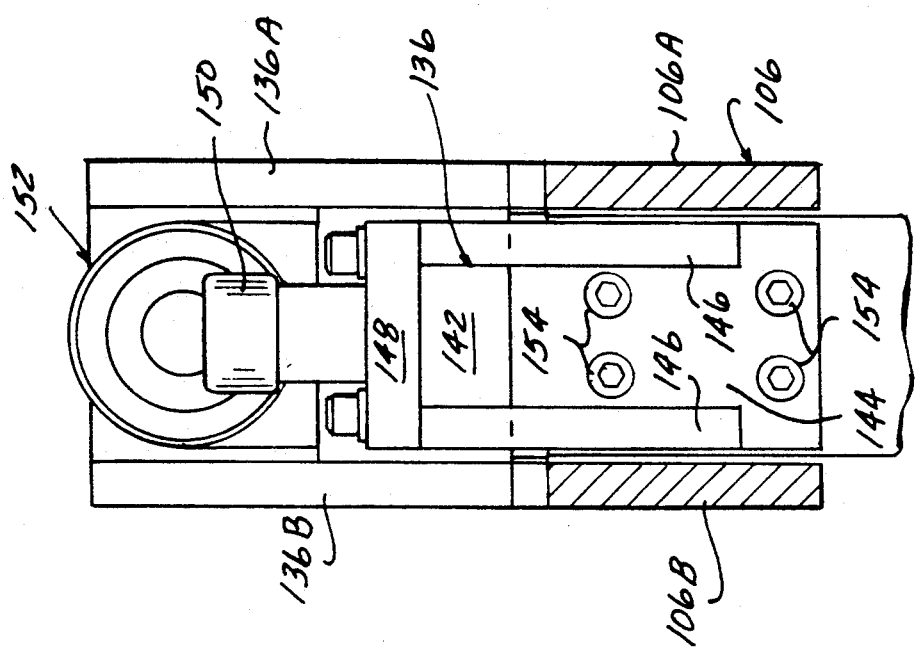
FIG. 6 is a detail cross sectional view taken on line 6—6 of FIG. 5.

A second workpiece engaging member designated generally 136 is fixedly mounted upon the end of piston rod 118 of motor M2 for horizontal movement from left to right or vice versa as viewed in FIGS. 4 and 5 with piston rod 118. Member 136 is formed with a pair of side plates 136A, 136B fixedly joined to each other at their rearward ends (right-hand end as viewed in FIGS. 4, 5 and 7) by a transversely extending web 138 lying in a vertical general plane and fixedly secured to a mounting bracket 140 employed to fixedly mount member 136 on piston rod 118. The side plates 136A, 136B are inclined downwardly from web 138 as best seen in FIGS. 4 and 5 and are integrally joined to each other at their forward or left-hand ends by a second cross web 142. A third cross web 144 is welded at its upper edge to the lower edge of web 142 and projects vertically downwardly from web 142 between the spaced side plates 106A, 106B of member 106 as best seen in FIG. 6. A pair of generally triangular support brackets 144 are welded to the front faces of webs 142, 144 to support a horizontal platform 148 at the forward end of member 136 which carries a workpiece engaging roller 150 mounted upon platform 148 for rotation about a vertical axis.

A laser beam focusing unit designated generally 152 is fixedly mounted to the rear of web 144 as by bolts 154 (FIG. 6), unit 152 projecting upwardly between the webs 106A, 106B of member 106 and side plates 136A, 136B of member 136. A fiberoptic cable 156 is employed to conduct a YAG laser beam from a laser, not shown, to unit 152, and unit 152 focuses a laser beam B at a focal point located in fixed relationship to the roller 150 of member 136 as was the case with the previously described embodiment of FIGS. 1-3. In that the roller 150 rotates about an axis which is fixed with respect to the member 136 upon which the beam focusing unit 152 is mounted, when roller 150 contacts one of the workpieces, the laser beam B can be precisely focused to a surface of the workpiece engaged by roller 150.

As was the case with the embodiment of FIGS. 1-3, the welding head 100 of FIGS. 4-7 clampingly grips the webs W3, W4 of the workpieces which are to be welded to each other between the rollers 134, 150 mounted on the respective members 106, 136. The gripping force, as in the previous case, is determined by the pressure supplied to motor M2, and the motor M2 and the two work engaging members 106, 136 constitute a workpiece gripping assembly which is capable of movement as a unit relative to the base member 102 of the head.

Referring to FIG. 5, where the head is shown with the workpiece engaging members in their open position, both rollers 134 and 150 are located clear of the workpieces supported in the welding position by the fixture F1. At this time, the spring 122 biases member 106 to the left as viewed in FIG. 5 to maintain the stop 126 on member 106 engaged With the stop 128 on base member 102. In that the cylinder 116 of motor M2 is mounted upon member 106 and the other workpiece engaging member 136 is fixed to the piston rod 118 of the motor, the head 100 may be positioned by robotic arm R1 in a ready position relative to the fixture supported workpieces WP3, WP4.

Referring now to FIG. 5, if motor M2 is actuated to extend piston rod 118 from the fully retracted position shown in FIG. 5, the initial extending movement will find cylinder 116 remaining stationary since spring 122 will resist movement of cylinder 116 to the right, and thus initially piston rod 118 advances member 136 to the left as viewed in FIG. 5. This leftward advance of member 136 continues until its roller 150 engages the web W3 of the workpieces supported on fixture F1. In that the workpieces are held stationary by the fixture, piston 118 cannot move any further to the left and the application of pressure to motor cylinder 116 to further extend the piston rod now drives cylinder 116 to the right as piston rod 118 remains stationary. Movement of cylinder 116 to the right as viewed in FIG. 5 carries with it member 106, this rightward movement of member 106 moving roller 134 toward web W4 of the workpieces. This rightward movement of member 106 moves stop 126 on that member away from stop 128 on base member 102, this rightward movement of member 106 compressing spring 120.

When piston rod 118 is fully extended relative to cylinder 116, the parts are in the position shown in FIG. 4 with the opposed webs of workpieces WP3 and WP4 firmly clamped against each other between rollers 134 and 150. As before, the clamping force is entirely dependent upon the pressure supplied to cylinder 116 of the actuating motor. As in the previous case, the robotic arm R1 is then actuated to advance the head 100 along the seam defined by the abutted webs of workpieces WP3 and WP4, this movement of the head being toward or away from the observer as viewed in FIG. 4. As in the previous case, a bending of the engaged webs of the workpieces to the left or to the right of the position shown in FIG. 4 will cause a bodily movement of the work gripping portions, namely members 106, 136 and motor M2 to the right or to the left as required by the divergence of the web portions of the workpieces to the left or to the right from the position of FIG. 4.

While two embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. A laser welding unit for laser welding two sheet metal members to each other while said sheet metal members are supported in abutment with each other in a welding position upon fixture means at a predetermined location, said fixture means supporting said sheet metal members in abutment with each other substantially along a linear welding path, said welding unit comprising a feeler member having a workpiece engaging member mounted at a fixed location thereon, laser beam focusing means mounted on said feeler member for focusing a laser beam upon said welding path when said workpiece engaging member is engaged with one of said sheet metal members in said welding position, a fluid pressure actuated cylinder-piston means for driving said feeler member relative to a fixture at said predetermined location along an actuating path generally normal to said welding path between a fully extended piston position of said cylinder-piston means and a fully retracted piston position of said cylinder-piston means to shift said workpiece engaging member into or out of engagement with said one of said sheet metal members, said cylinder-piston means being operable during piston extending movement to normally engage said workpiece engaging member with said one of said sheet metal members before said cylinder-piston means reaches its fully extended piston position, carrier means operable to move said welding unit along a seaming path relative generally conformed to said welding path, and spring means operable upon engagement of said engaging member and said one of said sheet metal members for biasing said engaging member against said one of said metal members while accommodating a limited amount of movement of said cylinder-piston means relative to said carrier means along said actuating path with said work engaging means maintained in contact with said one of said metal members throughout movement of said welding unit along said seaming path to maintain said laser beam focussed on said welding path in the face of minor variances in the positional relationship between said welding and seaming paths.

2. The invention defined in claim 1 wherein said work engaging means comprises a first roller mounted on said feeler member for rotation about a first axis normal to said seaming path.

3. The invention defined in claim 2 wherein said two sheet metal members are held by said fixture in substantial face to face abutment adjacent to and along substantially coextensive edges, said carrier means comprising a back up member, a second roller mounted upon said back up member for rotation about a second axis normal to said actuating path, said cylinder-piston means being coupled between said feeler member and said back up member to clamp said sheet metal members between said first and second rollers when said cylinder-piston means is in its fully extended piston position, said springs means accommodating movement of said feeler member, back up member and cylinder-piston means as a unit as required to maintain said beam focussed on said welding path when said sheet metal members are clamped between said first and second rollers.

4. The invention defined in claim 3 wherein said carrier means further comprises a base member and robotic arm means for moving said base member along said seaming path, said back up member being mounted on said base member, said spring means being engaged between said base member and one of said feeler and back up members.

5. The invention defined in claim 3 wherein said carrier means further comprises a base member and robotic arm means fixedly secured to said base member for moving said base member along said seaming path, said feeler member comprising a first elongate lever like arm having said first roller mounted at one thereof and said back up member comprising a second elongate lever like arm having said second roller mounted at one end thereof, pivot means mounting said first and second arms on said base member for pivotal movement about a common pivot axis intermediate the opposite ends of the respective arms, said cylinder-piston means being operatively coupled between the ends of said arms remote from said one ends thereof, said spring means being engaged between said base member and one of said arms, and stop means engageable between said base member and one of said arms for establishing one end limit of pivotal movement of said arms about said common pivot axis.

6. The invention defined in claim 5 wherein said cylinder-piston means when in said fully extended position is operable to cause said first and second rollers to clamp said sheet metal members in face to face engagement with each other with a predetermined clamping force as said rollers are carried along said seaming path in rolling engagement with said sheet metal members, said beam focusing means being mounted upon said feeler member to focus said beam along a beam axis lying in a plane contacting said first and second axes and spaced from said first roller.

7. The invention defined in claim 3 wherein said carrier means comprises a robotic arm means movable along a precisely fixed path conformed to said welding path, said welding unit beam remounted on said robotic arm means for movement therewith, said fixture means being operable to locate said sheet metal members in said welding position with said metal members in abutment with each other along a seaming line approximately congruent with said fixed path, said rollers when clampingly engaged with said sheet metal members locating said focusing means relative to said one of said metal members to focus said beam precisely on said seaming line, said spring means accommodating movement of said focusing means relative to said robotic arm means during movement of said robotic arm means along said fixed path as required to maintain said beam focused on said seaming line.

8. In a welding station including workpiece support means for supporting two sheet metal workpieces in a welding position wherein an elongate strip like portion of one of said workpieces is in face to face relationship to a generally coextensive elongate strip-like portion of the other of said workpieces along a longitudinally extending seaming path, and laser welding means at said station for laser welding said workpieces to each other along said seaming path;

the improvement wherein said welding means comprises a welding head, carrier means at said station for moving said welding head toward and away from at least one of said elongate portions of said workpieces in said welding position and for moving said head longitudinally along said one of said elongate portions along a welding path extending from one end of said seaming path to the other in substantially uniformly spaced relationship thereto, a first workpiece engaging member mounted on said carrier means for movement relative to said carrier means, a first workpiece engaging roller mounted on said first engaging member for rotation about a first axis normal to said welding path and for movement with said first engaging member relative to said carrier means along a first path normal to said first axis between a first position wherein said first roller is clear of said workpieces in said welding position and an extended position wherein said first roller engages said one of said elongate portions at said welding position for rolling movement therealong upon movement of said head along said welding path, fluid pressure actuated motor means on said head for moving said first engaging member on said carrier means to shift said first roller between said first and said extended position, spring means on said head biasing said first engaging member along said first path in a direction urging said first roller to its extended position, and laser beam focusing means mounted on said first engaging member for focusing a laser beam on said seaming path when said first roller is engaged with said one of said elongate portions.

9. The invention defined in claim 8 further comprising a second workpiece engaging member mounted on said carrier means for movement relative to said carrier means, a second roller mounted on said second engaging member for rotation about a second axis parallel to said first axis and for movement relative to said carrier means with said second engaging member along a second path substantially aligned with said first path between a second position clear of said workpieces in said welding position and an extended position wherein said second roller engages the other of said elongate portions at said welding position in opposed relationship to said first roller whereby said first and second rollers, when in their respective extended positions, clamp the engaged strip-like portions of said workpieces between said rollers in face to face abutment.

10. The invention defined in claim 9 wherein said fluid pressure actuated motor means comprises a cylinder and a piston rod reciprocable relative to said cylinder, said cylinder and said rod being coupled between said first and second engaging members to shift said first and second rollers along said first and second paths toward and away from said extended position in response to reciprocating movement of said rod relative to said cylinder.

11. The invention defined in claim 10 wherein said first and second engaging members and said motor means constitute a workpiece gripping assembly, means mounting said assembly upon said carrier means for movement as a unit relative to said carrier means in motion moving said first roller along said first path, said spring means being engaged between said carrier means and said gripping assembly.

12. The invention defined in claim 11 wherein said first and second workpiece engaging members are elongate members pivotally connected to each other intermediate their ends by a pivot pin, said pivot pin mounting said workpiece gripping assembly upon said base member for pivotal movement as a unit relative to said base member.

13. The invention defined in claim 11 further comprising means mounting one of said workpiece engaging members on said base member for reciprocating movement relative to said base member along a straight line path, means mounting said cylinder of said ,motor means on said one of said workpiece engaging members with the axis of said cylinder extending parallel to said straight line path, and means mounting the other of said workpiece engaging members upon said piston rod of said motor means.

* * * * *

UNITED STATES PATENT AND TRADEMARK OFFICE
CERTIFICATE OF CORRECTION

PATENT NO. : 5,142,118
DATED : August 25, 1992
INVENTOR(S) : Howard M. Schlatter It is certified that error appears in the above-identified patent and that said Letters Patent is hereby corrected as shown below:

Column 9, line 1, please delete "!4" and insert --14--.

Column 9, line 34, please delete "!!4" and insert --114--.

Column 9, line 51, please delete "!30" and insert --130--.

Column 9, line 60, delete "!18" and insert --118--.

Column 10, line 37, please delete "!02" and insert --102--.

Column 10, line 42, please delete "!06" and insert --106--.

UNITED STATES PATENT AND TRADEMARK OFFICE
CERTIFICATE OF CORRECTION

PATENT NO. : 5,142,118  
DATED : August 25, 1992  
INVENTOR(S) : Howard M. Schlatter It is certified that error appears in the above-indentified patent and that said Letters Patent is hereby corrected as shown below:

Column 10, line 52, delete "11B" and insert --118--

Signed and Sealed this

Twenty-second Day of March, 1994

Attest:

BRUCE LEHMAN

*Attesting Officer*      *Commissioner of Patents and Trademarks*